US 6,631,143 B1

(12) United States Patent
Karim

(10) Patent No.: US 6,631,143 B1
(45) Date of Patent: Oct. 7, 2003

(54) METHODS AND APPARATUS FOR FRAME SYNCHRONIZATION IN A DIGITAL AUDIO BROADCASTING SYSTEM

(75) Inventor: Muhammad R. Karim, Wayside, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/438,793

(22) Filed: Nov. 12, 1999

(51) Int. Cl.[7] ............................................. H04J 11/00
(52) U.S. Cl. ..................................... 370/514; 375/365
(58) Field of Search .............................. 370/203, 204, 370/206, 208, 210, 324, 350, 509, 514; 455/180.3, 214; 375/365, 368

(56) References Cited

U.S. PATENT DOCUMENTS

| 5,191,576 A | * | 3/1993 | Pommier et al. ............ 370/312 |
| 5,228,025 A | * | 7/1993 | Le Floch et al. ............ 370/206 |
| 5,471,464 A | * | 11/1995 | Ikeda ........................ 370/203 |
| 5,506,836 A | * | 4/1996 | Ikeda et al. ................. 370/203 |
| 5,867,478 A | * | 2/1999 | Baum et al. ................. 370/203 |
| 6,111,919 A | * | 8/2000 | Yonge, III ................... 375/260 |
| 6,151,295 A | * | 11/2000 | Ma et al. .................... 370/203 |

FOREIGN PATENT DOCUMENTS

CA        2230294        11/2002

OTHER PUBLICATIONS

D.C. Hartup et al., "AM Hybrid IBOC DAB System," USA Digital Radio, pp. 1–8, 1997.
R.L. Pickholtz et al, "Modeling and Performance of IBOC AM/DAB System," Petition for Rulemaking, Counsel for USA Digital Radio Partners, L.P., pp. 1–14, Oct. 7, 1998.

* cited by examiner

Primary Examiner—Hassan Kizou
Assistant Examiner—Dmitry Levitan

(57) ABSTRACT

A method for use in a receiver in an orthogonal frequency division multiplexing-based data transmission system of detecting frame synchronization with respect to a signal received from a transmitter in the system comprises the following steps. First, the received signal is searched at a first predetermined sub-carrier frequency and at least a second predetermined sub-carrier frequency for a previously inserted data pattern. Then a frame boundary in the received signal is identified as a position where the data pattern is detected at both the first predetermined sub-carrier frequency and the second predetermined sub-carrier frequency.

21 Claims, 5 Drawing Sheets

NUMBER OF OFDM FRAMES TAKEN TO SYNCHRONIZE

SNR(dB)

PROB {OFDM FRAME SYNCHRONIZATION IS ACHIEVED CORRECTLY}

SNR(dB)

PROB {OFDM FRAME SYCHRONIZATION IS CORRECT WITHIN n FRAMES} n

METHODS AND APPARATUS FOR FRAME SYNCHRONIZATION IN A DIGITAL AUDIO BROADCASTING SYSTEM

FIELD OF THE INVENTION

The invention relates generally to digital audio broadcasting systems and, more particularly, to frame synchronization techniques in digital audio broadcasting systems.

BACKGROUND OF THE INVENTION

The amplitude modulation In-Band-On-Channel (AM IBOC) Digital Audio Broadcasting (DAB) system, similar to the hybrid frequency modulation (FM) IBOC system, uses an orthogonal frequency division multiplexing (OFDM) scheme. In the OFDM scheme, a number of sub-carriers are modulated by a digital signal and then multiplexed together such that, in the time domain, adjacent symbols do not interfere with each other. To further minimize the inter-symbol interference, a guard period is added at the transmitter between each adjacent symbol-pair. Using a cyclic prefix or suffix in this guard period, one can determine OFDM frame boundaries. A combination of 32-QAM (quadrature amplitude modulation) and BPSK (binary phase shift keying) has been proposed as an approach for this system.

By way of an example of the use of a cyclic prefix or suffix, suppose that the useful symbol period contains 512 samples denoted as $x_0, x_1, \ldots, x_{511}$. A signal $\{y_n\}$ may be constructed in the following manner:

$$y_n = \begin{cases} x_{n+498}, & 0 \le n < 14 \\ x_{n-14}, & 14 \le n < 526 \\ x_{n-526}, & 526 \le n < 540 \end{cases}$$

In other words, the first 14 samples of $\{y_n\}$ are equal in amplitude and phase to the last 14 samples of the useful symbol period. They are said to constitute the cyclic prefix. Similarly, the last 14 samples of $\{y_n\}$ are the same as the first 14 samples of the useful symbol period. They are said to constitute the cyclic suffix.

However, in the AM IBOC DAB system, since each symbol is passed through a pulse shaper for additional signal conditioning, the standard OFDM frame synchronization procedure based on the correlation property of the cyclic prefix does not work. The cause of this problem is as follows. Since the output of a filter is given by the convolution of the input signal with the impulse response of the filter, when the input is passed through a pulse shaping filter, the samples in the guard period are no longer equal to the corresponding samples in the useful symbol period.

There is another, more difficult problem with the AM IBOC system. To support a higher data rate of the digital signal, digital data is transmitted over frequencies not only outside of the analog host bandwidth, but also in the bandwidth occupied by the host. The host bandwidth is 10 kHz (kilohertz). The digital signal bandwidth is 20 kHz. The signal in the outer digital lobes is about 5 dB (decibels) higher than the signal under the host. To minimize the interference from the digital signal to the analog AM, the level of the digital signal in the ±5 kHz frequency range must be about 20 dB below the analog signal. Also, to be able to recover the digital signal in the ±5 kHz in the presence of the stronger analog signal, it is necessary for the digital and analog signals to be in quadrature with respect to each other. Since the latter requirement should be met for any arbitrary data pattern, BPSK should be used for the OFDM sub-carriers under the analog host.

Therefore, there is a need for methods and apparatus for performing frame synchronization in a DAB system, such as the AM IBOC DAB system, which do not rely on the use of the cyclic prefix or suffix, and which eliminate or at least reduce the effects associated with the shortcomings of the prior art as discussed above and which otherwise exist in the art.

SUMMARY OF THE INVENTION

The present invention provides a robust OFDM frame synchronization procedure that does not depend on the use of the cyclic prefix or suffix. The procedure is based on sending, in each symbol period, a known data pattern, for example, 1, over two OFDM sub-carriers, for example, k and −k. In one exemplary embodiment, $1 \le |k| \le 36$. It is to be appreciated that k may be selected arbitrarily, however, k is selected such that the sub-carrier frequency is within the host spectrum and computations become simpler. Also, more than two sub-carriers can be used. That is, the known pattern may be inserted into more than two sub-carriers and transmitted.

In any case, in a preferred embodiment, the two sub-carriers are modulated using BPSK. To obtain frame synchronization, we search the demodulated signal for the known data pattern by taking the Fast Fourier Transform (FFT) of the received signal at sub-carriers k and −k. Synchronization is achieved when the same pattern is detected in both sub-carriers. Once synchronization is achieved, a phase-locked loop is used to track the OFDM frames. If synchronization is lost as indicated by the phase-locked loop, we return to the search mode.

Advantageously, the procedure works in the presence of a wide range of additive white Gaussian noise (AWGN) and interference from the analog host. For example, synchronization may be achieved when the SNR (signal-to-noise ratio) is 23 dB or more and host interference is 20 dB above the digital signal.

Although the procedure is particularly well-suited for sub-carriers in the above range, it can be used with any sub-carrier over the entire ±10 kHz range and other data patterns. Similarly, the frame synchronization algorithm of the invention works for higher analog AM signal levels as well.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

The following description will illustrate the invention using an exemplary AM IBOC DAB system. It should be understood, however, that the invention is not limited to use with this particular DAB system. The invention is instead more generally applicable to any DAB system in which it is desirable to provide a frame synchronization procedure in which a cyclic prefix is not necessarily relied upon.

Figure 1:
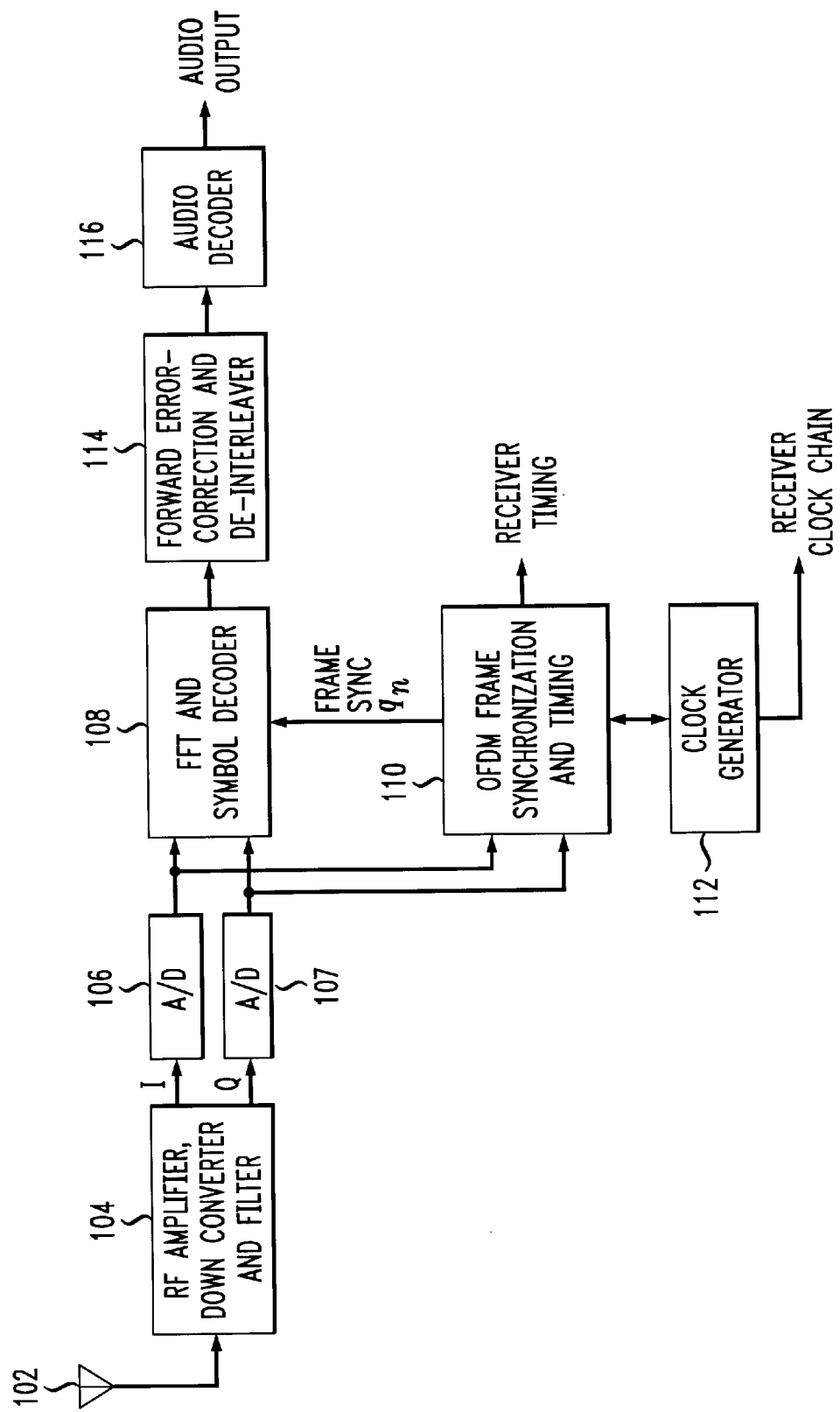
FIG. 1 is a block diagram illustrating an exemplary IBOC AM receiver for use in accordance with the present invention.

Referring initially to FIG. 1, a block diagram illustrating an exemplary IBOC AM receiver is shown. The receiver 100 includes: an antenna 102; a radio frequency (RF) amplifier, down converter and filter stage 104; analog-to-digital (A/D) converters 106 (in-phase or I component of baseband signal) and 107 (quadrature or Q component of baseband signal), a Fast Fourier Transform (FFT) and symbol decoder stage 108; an OFDM frame synchronization and timing stage 110; a clock generator 112; a forward error correction and de-interleaver stage 114; and an audio decoder 116. A description of the overall operation of the elements of the receiver 100 will be given below.

Figure 7:
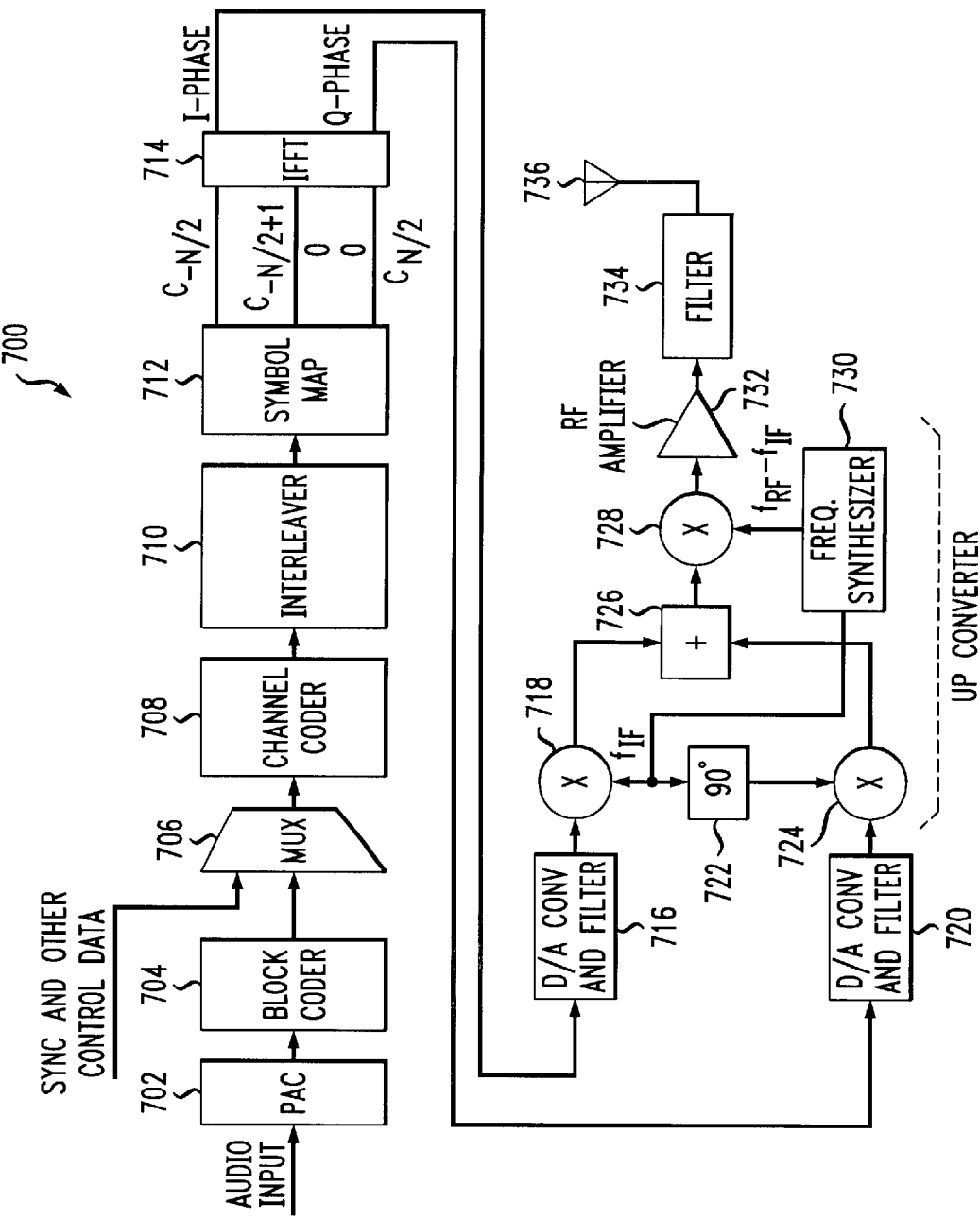
FIG. 7 is a block diagram illustrating an exemplary transmitter for use in accordance with the present invention.

First, it is to be noted that the frame synchronization procedure implemented by the receiver is based on sending from a corresponding transmitter, in each symbol period, a known data pattern over two OFDM sub-carriers, for example, k and −k. In one embodiment, for example, the data pattern may simply be a value of 1. However, any suitable data pattern may be used. Also, in one exemplary embodiment, $1 \leq |k| \geq 36$. The two sub-carriers are modulated using BPSK. The insertion of the data pattern, in each symbol period, in accordance with the two OFDM sub-carriers k and −k may be accomplished in a conventional manner. Given the inventive teachings described herein, one of ordinary skill in the art will appreciate various manners of implementing the data pattern insertion and sub-carrier modulation operations in a suitable OFDM transmitter. Nonetheless, an example of a transmitter for use with the invention is illustrated in FIG. 7 and will be described following the description of the receiver.

We turn now to the description of the overall operation of the elements of the receiver 100 depicted in FIG. 1. The RF signal received at antenna 102 is amplified, down-converted and filtered in block 104 to obtain the in-phase (I) and quadrature (Q) components of a baseband signal. These I and Q components are sampled by A/D converters 106 and 107, respectively, and fed into decoder 108 and also into the OFDM frame synchronization and timing circuit 110. The latter uses a frame synchronization algorithm, in accordance with the present invention, to generate a frame sync output that points to the sample number identifying the start of an OFDM frame. This frame sync output is used in block 108 to remove the samples of the guard period. The remaining samples of the useful symbol period are converted into the frequency domain by FFT. The output of the FFT engine is demodulated to recover the digital data that was used at the transmitter to modulate the sub-carriers. The output of block 108 is applied to the input of block 114 which performs error correction, if necessary, and de-interleaving. The resulting output is fed into the audio decoder. The output of the OFDM frame synchronization and timing circuit 110 is also used in timing circuit 112 to provide a synchronized time base for use at different points in the receiver.

It is to be appreciated that the frame synchronization methodology of the invention may be employed in the OFDM frame synchronization unit 110 of the receiver 100. A detailed description of an embodiment of the frame synchronization methodology of the invention will now follow.

Figure 2:
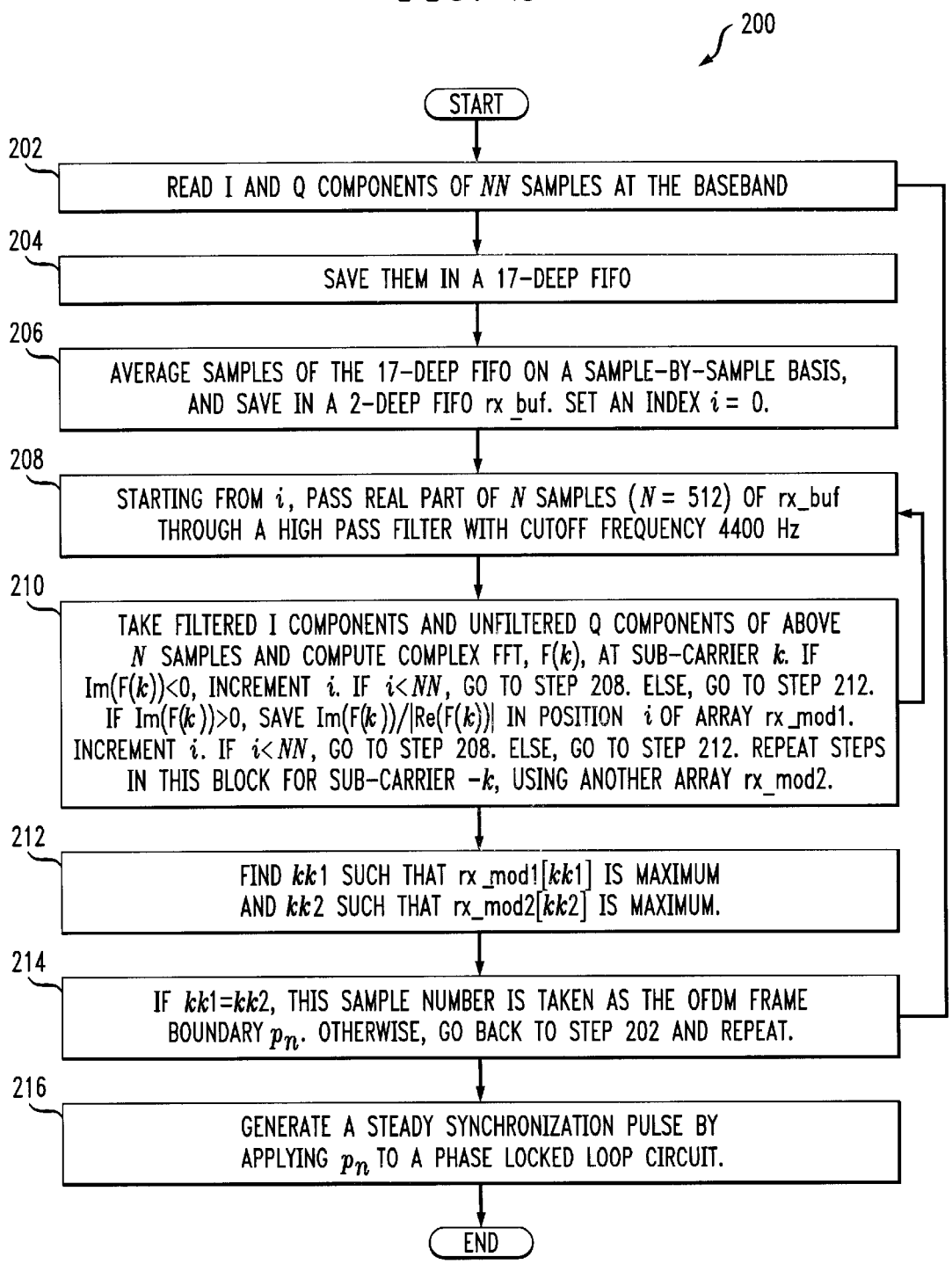
FIG. 2 is a flow diagram illustrating a frame synchronization procedure according to an embodiment of the present invention.

Referring now to FIG. 2, a flow diagram illustrating a frame synchronization procedure 200 according to an exemplary embodiment of the present invention is shown. In step 202, the method includes obtaining samples of both the in-phase (I) and quadrature (Q) components of the baseband signal. Such samples of the I and Q components of the received baseband signal are taken in the A/D converters 106 and 107 (FIG. 1), respectively. The frame synchronization unit 110 (FIG. 1) reads the samples from the A/D converters. Preferably, NN samples $x_0, \ldots, x_{NN-1}$ of the baseband I and Q components are read where NN may be, e.g., 540. That is, 540 I samples and 540 Q samples may be read, such that N=512, as explained below, and NN=540.

In step 204, the samples are saved in a FIFO associated with the frame synchronization unit 110. Preferably, the FIFO has the capacity to store samples associated with the latest 17 OFDM frames and is thus referred to as a 17-deep FIFO.

Next, in step 206, the received baseband signal, stored as samples in the 17-deep FIFO, is averaged on a sample-by-sample basis. That is, the I component samples are averaged and the Q component samples are averaged. The averaged samples are then stored in another FIFO, preferable a 2-deep FIFO, called rx_buf. Also, an index i is set equal to 0.

In step 208, starting from i, where i is initially set to zero, the method includes taking complex samples $x_1, \ldots, x_{i+N-1}$ of rx_buf and high-pass filtering the I components of this signal using a high pass filter associated with the frame synchronization unit 110 having a cutoff frequency of preferably 4400 Hz. In other words, staring from i, we pass the real part of N samples (N=512) of rx_buf through a high pass filter with a cutoff frequency of 4400 Hz.

In step 210, we take the filtered I components and unfiltered Q components of N samples from rx_buf and compute the complex FFT at sub-carrier k using the following relation:

$$F(k) = \sum_{n=0}^{N-1} x_n e^{-j2\Pi kn/N}.$$

Recall that OFDM sub-carrier k is modulated by the desired digital signal that is being used for OFDM frame synchronization.

Next, we examine the sign of the imaginary part of F(k), or Im(F(k)). If the sign of Im(F(k)) is negative, we increment i by 1. If i<NN, return to step 208, else, we go to step 212. If the sign of Im(F(k)) is positive, we compute Im(F(k))/|Re(F(k))|, where Re(F(k)) is the real part of F(k), and save it in position i of an N-element array, for example, rx_mod 1. We increment i by 1. If i<NN, return to step 208, else, we go to step 212.

The same sub-steps of step 210 described above are repeated for sub-carrier −k. In other words, we take the FFT of the same samples as above, but now with k replaced by −k. The method then includes examining the sign of the imaginary part of F(−k), or Im(F(−k)). If Im(F(−k)) is negative, increment i by 1. If i<NN, return to step 208, else, we go to step 212. If the sign of Im(F(−k)) is positive, we compute Im(F(−k))/ |Re(F(−k))|, where Re(F(−k)) is the real part of F(−k), save it in position i of an N-element array, e.g., rx_mod 2. We increment i by 1. If i<NN, return to step 208, else, we go to step 212. Notice that OFDM sub-carrier −k is modulated by the same desired digital signal that is being used for OFDM frame synchronization.

When i=N, the method includes searching array rx_mod 1 and determining index kk1 where the array has the maximum value. Similarly, we determine kk2 such that rx_mod 2 is a maximum value at this index. This is accomplished in step 212. If kk1=kk2, this sample number is taken to be the frame boundary, in step 214. This frame boundary is indicated by sample number $p_n$. If kk1≠kk2, the next NN samples of the received data are read into the 17-deep FIFO (steps 202 and 204) and the entire procedure is repeated.

Figure 3:
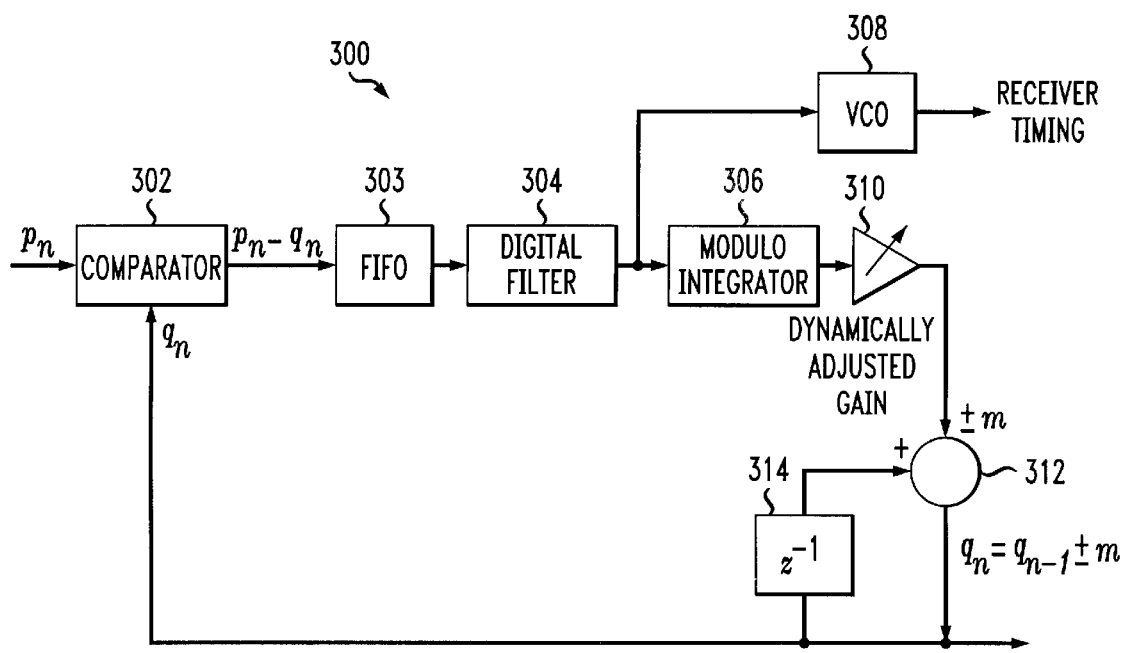
FIG. 3 is a block diagram illustrating a phase locked loop circuit according to an embodiment of the present invention.

In step 216, the sample $p_n$, indicative of the frame boundary, is applied to the input of a phase-locked loop associated with the frame synchronization and timing stage 110 (FIG. 1), as shown in FIG. 3. It is to be appreciated that a purpose of this loop is to generate a steady sync pulse $q_n$, in the presence of channel impairments and receiver timing that is in synchronism with the transmitter.

Referring now to FIG. 3, a block diagram illustrating a phase locked loop circuit 300 according to an embodiment of the present invention is shown. The phase-locked loop 300 works in the following way. The estimated frame boundary, $p_n$, which is actually a pointer, is compared in a comparator 302 with the output $q_n$ of a block 312, and the difference is saved in a 36-deep FIFO 303. Depending on this difference, the loop gain is adjusted in each symbol period. The differences in the pointer values saved in the FIFO are averaged over the latest 36 frames and passed through filter 304, integrated in modulo integrator 306, and amplified in block 310, whose gain is adjusted dynamically. The output of the amplifier ±m is rounded off to the nearest integer, and added algebraically in block 312 to its past output $q_{n-1}$ generated via delay unit 314, to generate the current loop output $q_n$. For fast acquisition, the initial value $q_0$ of $q_n$ is set to $p_0$. Further, a voltage controlled oscillator (VCO) 308 is provided which is phase-locked to the transmitter, and provides timing to various points in the receiver, e.g., A/D converter, de-interleaver, symbol decoder, etc.

In an experiment to evaluate a frame synchronization procedure of the invention, the following performance parameters were measured: (i) the time it takes to achieve synchronization for different values of SNR in the presence of an analog host; (ii) the probability of correct synchronization as a functions of SNR when the analog host is present; and (iii) the probability distribution function of the exact synchronization.

Figure 4:
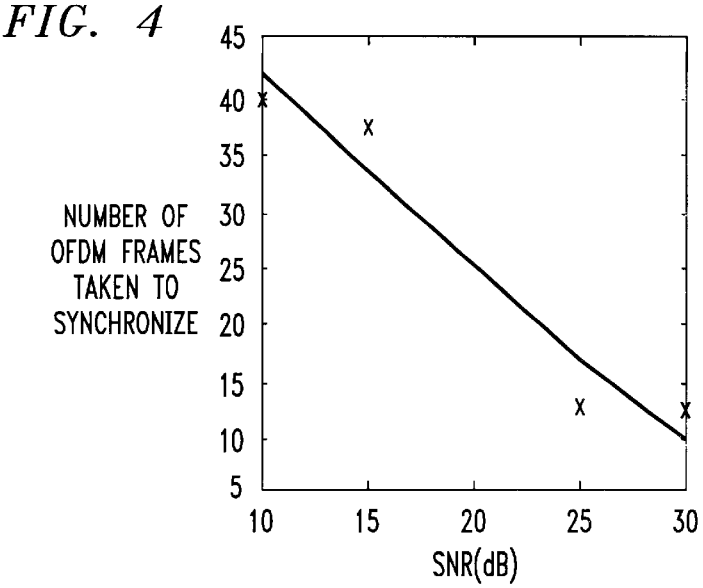
FIG. 4 is a graphical representation illustrating the time to achieving OFDM frame synchronization according to the present invention.

FIG. 4 shows the time it takes to achieve OFDM frame synchronization in the presence of an AM host as a function of SNR. This time is given in terms of the number of OFDM frames. The experiment was conducted in the presence of varying amounts of noise with the AM host signal strength set to 20 dB above the digital signal. The noise is white Gaussian. The SNR was measured by averaging the signal and noise power over the entire ±20 kHz bandwidth of the digital signal. A digital one value was transmitted in all OFDM frames over sub-carriers k=1 and −1, using BPSK satisfying the conditions that were discussed above in the background section. For SNR of 25 dB or more, synchronization is achieved within about 12 frames, and takes longer with lower values of SNR.

Figure 5:
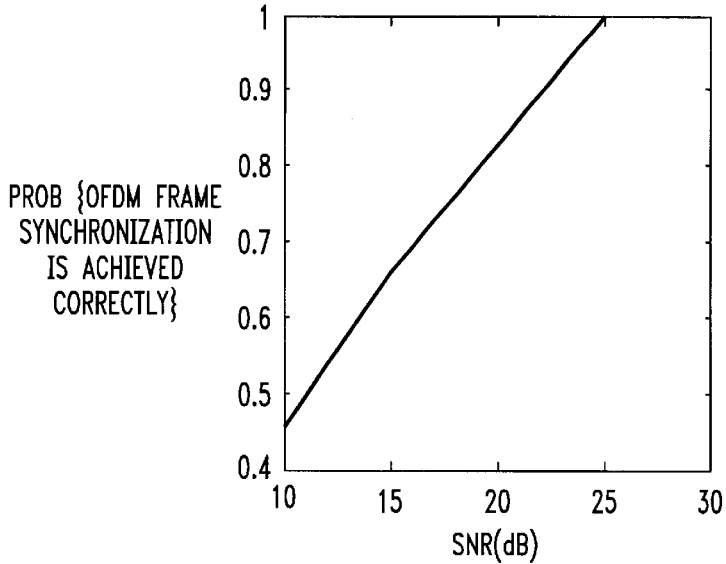
FIG. 5 is a graphical representation illustrating the probability of correct synchronization for different values of a signal-to-noise ratio according to the present invention.

FIG. 5 shows the probability of correct synchronization for different values of SNR. The AM host signal level was held constant at 20 dB above the digital signal. It should be emphasized here that perfect synchronization is achieved for SNR of 23 dB or more.

Figure 6:
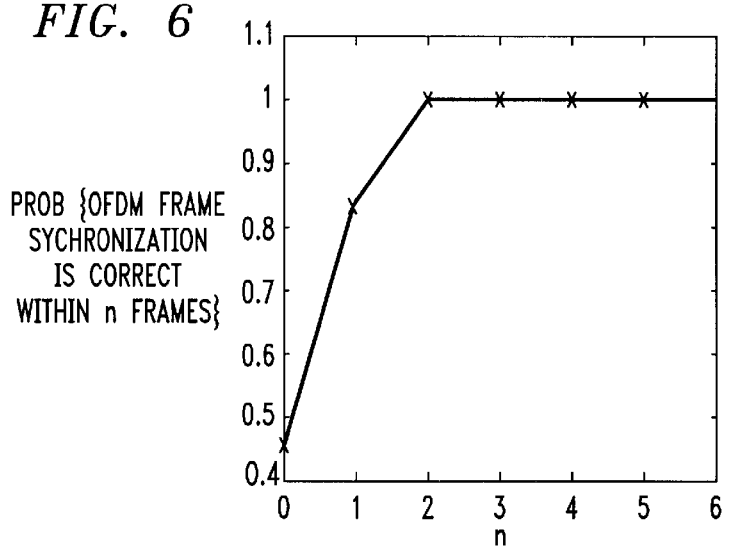
FIG. 6 is a graphical representation illustrating the probability distribution for achieving OFDM frame synchronization according to the present invention.

Synchronization is not perfect for smaller values of SNR. If the SNR is, for example, 20 dB, perfect synchronization is achieved with a probability of about 0.83. In other words, at this SNR, an occasional error would be made in synchronization. Nevertheless, in most cases, synchronization would be correct within 1 or 2 samples. This is shown in the probability distribution function of FIG. 6. Here, the probability that correct synchronization is achieved within ±n frames is plotted as a function of n. For FIG. 6, the SNR is 10 dB and the host signal strength is 20 dB above the digital signal. Notice that even with 10 dB SNR, the synchronization is off by no more than 2 samples. It is to be appreciated that the frame synchronization methodology of the invention works for higher analog AM signal levels as well.

Referring now to FIG. 7, a block diagram illustrating an exemplary transmitter for use in accordance with the present invention is shown. As mentioned, the frame synchronization procedure implemented by the receiver is preferably based on sending from a corresponding transmitter, in each symbol period, a known data pattern over two OFDM sub-carriers, for example, k and −k. The two sub-carriers are modulated using BPSK. FIG. 7 illustrates one exemplary OFDM transmitter for implementing the data pattern insertion and sub-carrier modulation operations.

As shown in FIG. 7, audio signal to be transmitted is input to a perceptual audio coder (PAC) 702 where it is digitally encoded. The output of the PAC is then block coded in a block coder 704. Then, in multiplexer 706, the encoded audio data is multiplexed with synchronization and other control data. It is to be appreciated that this is where the synchronization data pattern used by the receiver, according to the invention, is preferably inserted. The output of the multiplexer is encoded in accordance with an error-correcting convolutional code in a channel coder 708. To mitigate the effects of Rayleigh fades and clustered errors that are characteristic of this channel, the data bits of the channel coder output are re-ordered in an interleaver 710 according to some rules, and mapped into symbols, in accordance with a symbol map 712, which then modulate a number of carriers of an OFDM system including, for example, k and −k. The output of the map 712 is subjected to an Inverse Fast Fourier Transform (IFFT) in block 714. It is to be appreciated that the symbol map block and the IFFT block comprise the OFDM transmission system. Then, as is well known in the art, blocks 716 through 734 comprise IF and RF sections with antenna 736.

It should be noted that the elements of the receiver 100 (FIG. 1) and, in particular, the frame synchronization and timing stage 110, (and the elements of the transmitter 700 (FIG. 7)) may be implemented using a central processing unit, microprocessor, application-specific integrated circuit, digital signal processor or other data processing device in a computer or an audio receiver (transmitter). The central processing unit, microprocessor, application-specific integrated circuit, digital signal processor, or other data processing device may also have memory associated therewith for storing data and results associated with each element's function when necessary. The invention may be utilized in conjunction with numerous types of audio processing or transmission systems.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for use in a receiver in an orthogonal frequency division multiplexing-based data transmission system of detecting frame synchronization with respect to a signal received from a transmitter in the system, the method comprising the steps of:

searching the received signal at a first predetermined sub-carrier frequency and at least a second predetermined sub-carrier frequency for a previously inserted data pattern; and identifying a frame boundary in the received signal as a position where the data pattern is detected at both the first predetermined sub-carrier frequency and the second predetermined sub-carrier frequency.

2. The method of claim 1, wherein the system is a digital audio broadcasting system.

3. The method of claim 1, wherein the system is an amplitude modulation in-band-on-channel digital audio broadcasting system.

4. The method of claim 1, wherein the searching step comprises the step of obtaining NN in-phase component samples and NN quadrature component samples associated with the received signal.

5. The method of claim 4, wherein the searching step further comprises the step of respectively averaging the in-phase and quadrature component samples.

6. The method of claim 5, wherein the searching step further comprises the step of high-pass filtering each N in-phase component sample, where N is less than NN.

7. The method of claim 6, wherein the searching step further comprises the step of computing a Fast Fourier Transform F(k) at the first predetermined sub-carrier frequency for N filtered in-phase component samples and N unfiltered quadrature component samples.

8. The method of claim 7, wherein the searching step further comprises the step of respectively storing in a first set of index positions i, where i corresponds to N, the imaginary part of each F(k) when the imaginary part of F(k) is positive.

9. The method of claim 8, wherein the first set of index positions is an array.

10. The method of claim 8, wherein the searching step further comprises the step of computing a Fast Fourier Transform F(−k) at the second predetermined sub-carrier frequency for N filtered in-phase component samples and N unfiltered quadrature component samples.

11. The method of claim 10, wherein the searching step further comprises the step of respectively storing in a second set of index positions i, where i corresponds to N, the imaginary part of each F(−k) when the imaginary part of F(−k) is positive.

12. The method of claim 11, wherein the second set of index positions is an array.

13. The method of claim 11, wherein the searching step further comprises the step of searching the first and second sets of index positions to identify the respective positions therein having maximum values.

14. The method of claim 13, wherein the frame boundary identifying step further comprises the step of identifying as the frame boundary the sample N where the maximum values associated with the respective index positions are equivalent.

15. The method of claim 1, further comprising the step of generating a frame synchronization signal based on the identified frame boundary.

16. The method of claim 15, wherein the frame synchronization signal is generated by a phase locked loop circuit.

17. The method of claim 1, wherein the second predetermined sub-carrier frequency is a complement of the first predetermined sub-carrier frequency.

18. Apparatus for use in a receiver in an orthogonal frequency division multiplexing-based data transmission system for detecting frame synchronization with respect to a signal received from a transmitter in the system, the apparatus comprising:

at least one processing device operative to: (i) search the received signal at a first predetermined sub-carrier frequency and at least a second predetermined sub-carrier frequency for a previously inserted data pattern; and (ii) identify a frame boundary in the received signal as a position where the data pattern is detected at both the first predetermined sub-carrier frequency and the second predetermined sub-carrier frequency.

19. A method for use in a transmitter in an orthogonal frequency division multiplexing-based data transmission system, the method comprising the steps of:

inserting, in each symbol period of a signal over a first predetermined sub-carrier frequency and at least a second predetermined sub-carrier frequency, a data pattern for use in frame synchronization with respect to the signal at a receiver in the system; and modulating the signal for transmission.

20. Apparatus for use in a transmitter in an orthogonal frequency division multiplexing-based data transmission system, the apparatus comprising:

at least one processing device operative to: (i) insert, in each symbol period of a signal over a first predetermined sub-carrier frequency and at least a second predetermined sub-carrier frequency, a data pattern for use in frame synchronization with respect to the signal at a receiver in the system; and (ii) modulate the signal for transmission.

21. An orthogonal frequency division multiplexing-based data transmission system comprising:

a transmitter operative to: (i) insert, in each symbol period of a signal over a first predetermined sub-carrier frequency and at least a second predetermined sub-carrier frequency, a data pattern; and (ii) modulating and transmitting the signal; and a receiver operative to: (i) receive the transmitted signal; (ii) search the transmitted signal at the first predetermined sub-carrier frequency and the at least a second predetermined sub-carrier frequency for the inserted data pattern; and (iii) identify a frame boundary in the received signal as a position where the data pattern is detected at both the first predetermined sub-carrier frequency and the second predetermined sub-carrier frequency.

* * * * *